(12) United States Patent
Kawasaki

(10) Patent No.: US 9,580,063 B2
(45) Date of Patent: Feb. 28, 2017

(54) MOTOR CONTROL APPARATUS FOR HYBRID VEHICLES

(71) Applicant: DENSO CORPORATION, Kariya, Aichi-pref. (JP)

(72) Inventor: Shingo Kawasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/037,568

(22) Filed: Sep. 26, 2013

(65) Prior Publication Data

US 2014/0088808 A1 Mar. 27, 2014

(30) Foreign Application Priority Data

Sep. 26, 2012 (JP) ................. 2012-212493

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2016.01) | |
| *B60W 10/06* | (2006.01) | |
| *B60W 10/08* | (2006.01) | |
| *B60W 10/02* | (2006.01) | |
| *B60K 6/48* | (2007.10) | |
| *B60W 30/20* | (2006.01) | |
| *F16H 61/00* | (2006.01) | |

(Continued)

(52) U.S. Cl.
CPC ............. *B60W 20/00* (2013.01); *B60K 6/48* (2013.01); *B60W 10/02* (2013.01); *B60W 10/06* (2013.01); *B60W 10/08* (2013.01); *B60W 30/20* (2013.01); *B60K 6/543* (2013.01); *B60W 2510/0208* (2013.01); *B60W 2510/0266* (2013.01); *B60W 2510/0695* (2013.01); *B60W 2510/081* (2013.01); *B60W 2510/088* (2013.01); *B60W 2710/081* (2013.01); *B60W 2710/083* (2013.01); *Y02T 10/6221* (2013.01); *Y02T 10/7258* (2013.01); *Y10S 903/93* (2013.01)

(58) Field of Classification Search
CPC ...... B60W 20/00; B60W 10/06; B60W 10/08; B60W 10/02; F16H 61/06; F16H 61/662
USPC .................... 701/22; 477/45, 149; 318/400.3
See application file for complete search history.

(56) References Cited

U.S. PATENT DOCUMENTS 8,386,140 B2 2/2013 Tsuda et al.
2008/0020897 A1* 1/2008 Honma et al. ................ 477/149
(Continued)

FOREIGN PATENT DOCUMENTS

JP 2009-143360 7/2009

*Primary Examiner* — Mahmoud Ismail
(74) *Attorney, Agent, or Firm* — Nixon & Vanderhye P.C.

(57) ABSTRACT

An apparatus controls a motor equipped in a hybrid vehicle. In this apparatus, a basic torque command value of the motor is calculated so as to reduce a deviation between a target rotation speed and an actual rotation speed of the motor. A torque correction value for the motor is calculated based on a variation of the target rotation speed which is obtained per unit time and a value of inertia of a power train rotated integrally with the rotation shaft of the motor. Further, a torque command value finally supplied to the motor is calculated by correcting the basic torque command value with use of the torque correction value.

8 Claims, 6 Drawing Sheets

(51) Int. Cl.
  *F16H 61/662* (2006.01)
  *F16H 61/06* (2006.01)
  *F16H 61/08* (2006.01)
  *B60K 6/543* (2007.10)

(56) References Cited

U.S. PATENT DOCUMENTS

2010/0160111 A1* 6/2010 Yamanaka et al. ............. 477/45
2013/0009576 A1   1/2013 Iwashita et al.

* cited by examiner

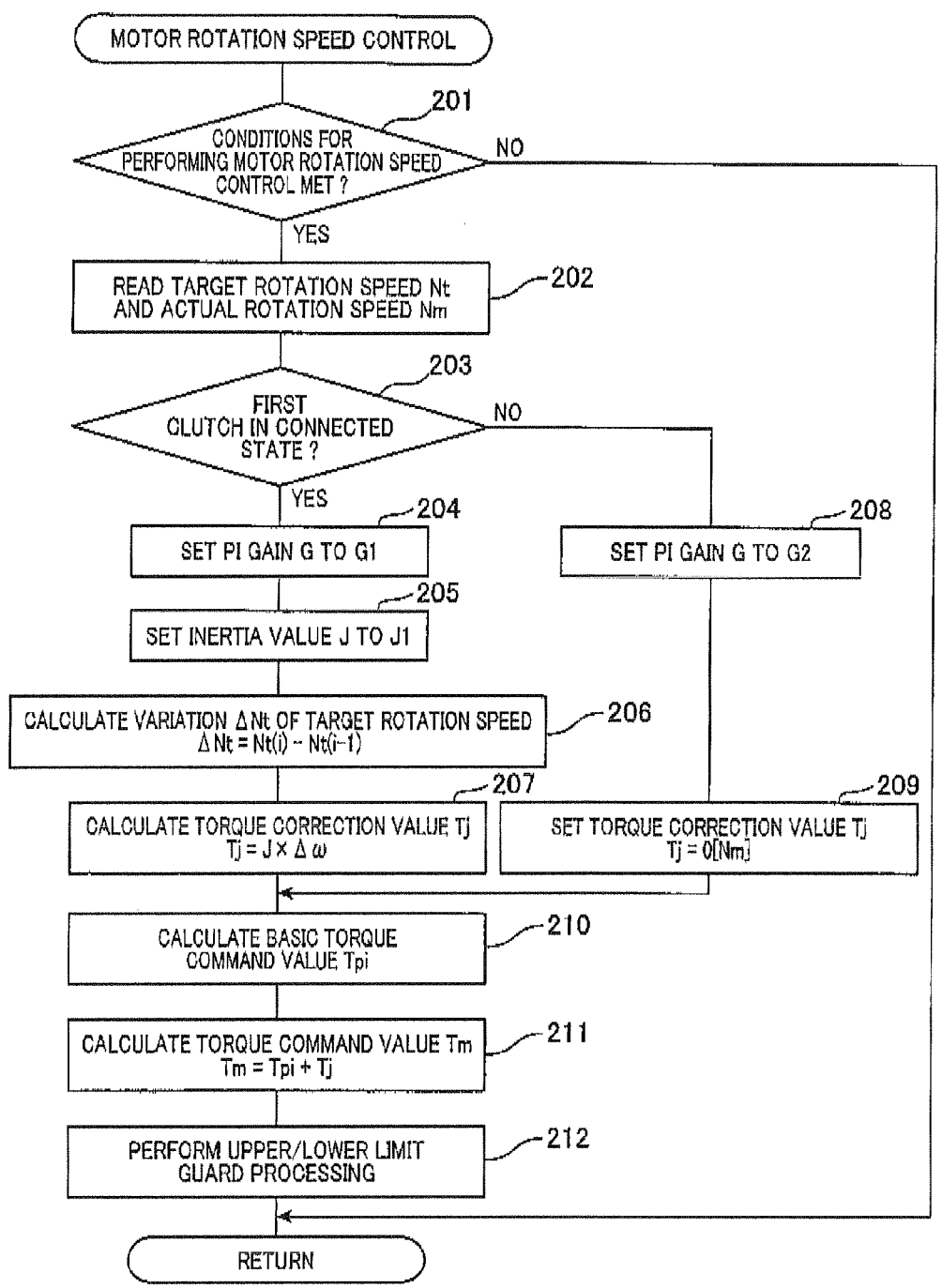

MOTOR CONTROL APPARATUS FOR HYBRID VEHICLES

CROSS-REFERENCE TO RELATED APPLICATION

This application is based on and claims the benefit of priority from earlier Japanese Patent Application No. 2012-212493 filed Sep. 26, 2012, the description of which is incorporated herein by reference.

BACKGROUND OF THE INVENTION

Technical Field of the Invention

The present invention relates to a motor control apparatus for a hybrid vehicle that has an engine and a motor as motive power sources of the vehicle.

Related Art

Recently, hybrid vehicles have come to capture attention. In light of the growing societal needs for good fuel efficiency and low emission of exhaust gas, hybrid vehicles have an engine and a motor installed as motive power sources of the vehicles. As disclosed in JP-A-2009-143360, for example, such a hybrid vehicle includes a system which is provided with a first element (e.g., the rotating part of a dog clutch) whose rotation is controlled by the motor and a second element (e.g., the stationary part of the dog clutch) which is brought into engagement with the first element. The first and second elements are synchronized in their rotation phase by allowing the motor to output predetermined torque. In this system, an inertial torque of the motor shaft is calculated on the basis of the inertial masses of the engine and the motor and the rotation speed of the motor. Then, the predetermined torque is corrected by the so inertial torque before being outputted to the motor.

The inventor of the present invention pursues research on a system for controlling rotation speed of a motor (hereinafter this control is referred to as "motor rotation speed control") in a hybrid vehicle in which the motor is connected to the power train of engine. In the motor rotation speed control performed in this system, when predetermined conditions are met (e.g., when the clutch located between the motor and the transmission is in a disconnected state), a torque command value is calculated under PI (proportional plus integral) control so that the deviation between a target rotation speed and an actual rotation speed of the motor is reduced. In the process of the research, a new issue as set forth below has been revealed.

As shown in FIG. 1, in a hybrid vehicle in which the motor is connected to the power train of engine, rotation fluctuation (fluctuation in the actual rotation speed) may be caused in the motor, while the motor rotation speed control is performed, being influenced by the rotation fluctuation of the engine, which is induced by combustion. In such a case, when the gain of the PI control is large, the torque command value for the motor may vary (oscillated) due to the fluctuation in the actual rotation speed of the motor, raising a problem of causing instability in the torque of the motor. As a measure against this, the gain of the PI control may be reduced to suppress the variation of the torque command value for the motor, which variation is caused by the rotation fluctuation of the engine. However, reducing the gain of the PI control may raise another problem of impairing the responsiveness of the motor rotation speed control, thereby increasing the rotation speed deviation (deviation of the actual rotation speed with respect to the target rotation speed) of the motor.

SUMMARY

It is thus desired to provide a motor control apparatus for a hybrid vehicle, which is able to ensure responsiveness of motor rotation speed control (control of the rotation speed of a motor), while stabilizing the torque of the motor.

There is provided an apparatus for controlling a motor equipped in a hybrid vehicle equipped with, in addition to the motor having a rotation shaft, an engine, a power train, and wheels, motive power from the engine being transmitted to the wheels via the power train, the motor being connected to the power train such that motive power from the motor is transmitted to the power train, the apparatus comprising: first torque command value calculating means for calculating a basic torque command value of the motor so as to reduce a deviation between a target rotation speed of the motor and an actual rotation speed of the motor; torque correction value calculating means for calculating a torque correction value for the motor based on a variation of the target rotation speed which is obtained per unit time and a value of inertia of the power train rotated integrally with the rotation shaft of the motor; and second torque command value calculating means for calculating a torque command value finally supplied to the motor, by correcting the basic torque command value with use of the torque correction value.

With this configuration, the gain for calculating the basic torque command value is reduced to some extent so as to reduce the deviation between the target rotation speed and the actual rotation speed of the motor. Thus, the variation of the basic torque command value due to the rotation fluctuation of the engine is suppressed and thus the final torque command value is suppressed from being varied, thereby stabilizing the torque of the motor.

Further, the torque correction value is calculated on the basis of the variation of the target rotation speed and the inertia value. Using the torque correction value, the basic torque command value is corrected to thereby obtain the final torque command value. Thus, the final torque command value can be set by feed-forwardly correcting the basic torque command value. In this way, the responsiveness of the motor rotation speed control is suppressed from being impaired and thus the rotation speed deviation of the motor (deviation of the actual rotation speed with respect to the target rotation speed) can be reduced.

BRIEF DESCRIPTION OF THE DRAWINGS

In the accompanying drawings:

FIG. 6 is a flow diagram illustrating a flow of steps in a motor rotation speed control routine, according to a second embodiment of the present invention.

DETAILED DESCRIPTION OF THE PREFERRED EMBODIMENTS

With references to the accompanying drawings, hereinafter are described some embodiments to which specific modes for implementing the present invention are applied.

[First Embodiment]

Referring to FIGS. 2 to 5, a first embodiment of the present invention is described.

Figure 1:
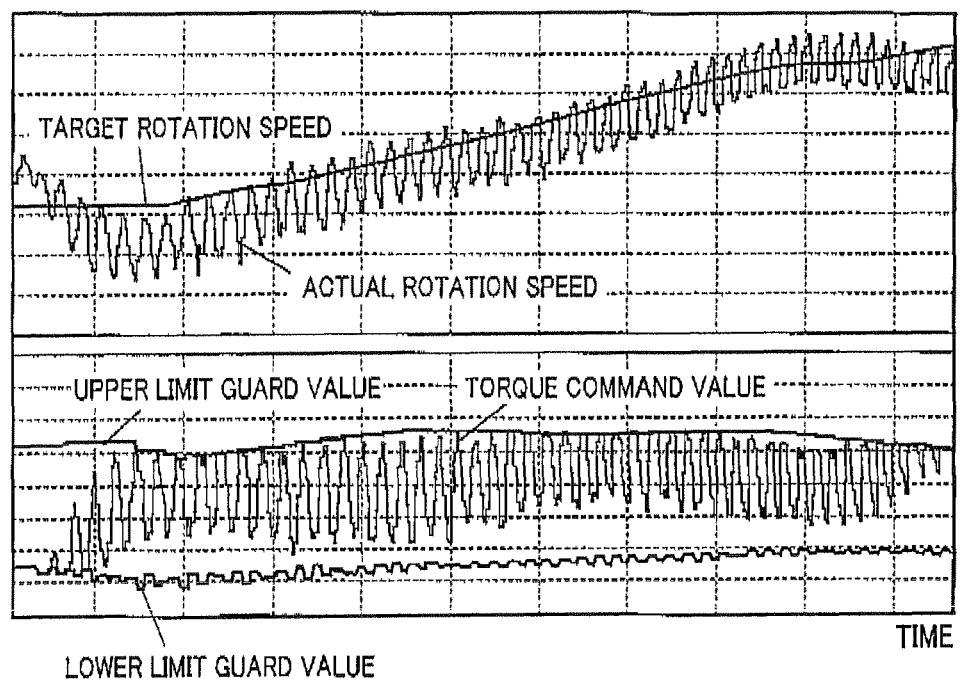
FIG. 1 is a time diagram illustrating a state where actual rotation speed of a motor has been fluctuated and torque command value has been varied.
Figure 2:
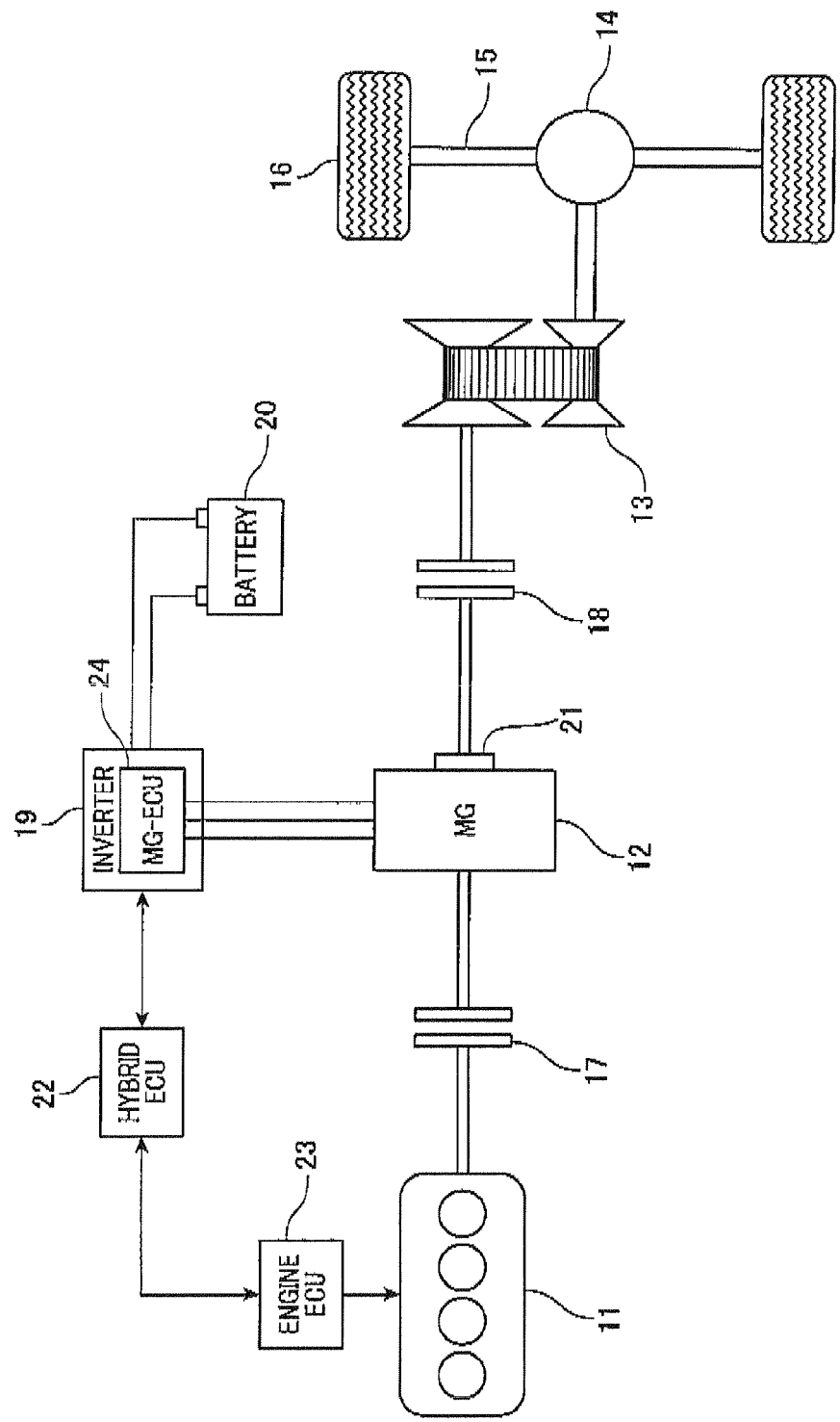
FIG. 2 is a schematic diagram illustrating a drive system of a hybrid vehicle, according to a first embodiment of the present invention.

FIG. 2 is a schematic diagram illustrating a drive system of a hybrid vehicle, according to the first embodiment. As shown in FIG. 2, the drive system includes an engine 11 that is an internal combustion engine and a motor-generator (hereinafter is referred to as "MG") 12 as motive power sources of the vehicle. The motive power of an output shaft (crank shaft) of the engine 11 is transmitted to a transmission 13 via the MG 12. Then, the motive power of an output shaft of the transmission 13 is transmitted to wheels 16 via a differential gear mechanism 14, an axle shaft 15 and the like. The transmission 13 may be a step transmission in which a gear range is changed stepwise among a plurality of gear ranges, or may be a CVT (continuously variable transmission) in which a gear range is changed in a stepless manner.

The engine 11 and the transmission 13, which configure a power train for transmitting the motive power of the engine 11 to the wheels 16, are connected via a rotary shaft of the MG 12 so as to enable transmission of the motive power therebetween. The drive system also includes a first clutch 17, which is located between the engine 11 and the MG 12, to connect/disconnect transmission of the motive power, and a second clutch 18, which is located between the MG 12 and the transmission 13, to connect/disconnect transmission of the motive power. The clutches 17 and 18 may be hydraulically-driven clutches, or may be electromagnetically-driven clutches.

The drive system further includes an inverter 19 which is connected to a battery 20 so as to drive the MG 12. Thus, the MG 12 is ensured to deliver and accept electrical power to/from the battery 20 via the inverter 19. The MG 12 includes a rotation speed sensor 21 that detects the rotation speed of the MG 12.

The drive system also includes a hybrid ECU (electronic control unit) 22 that is a computer for comprehensively controlling the entire vehicle. The ECU 22 reads output signals of various sensors and switches, such as an accelerator sensor, brake switch, vehicle sensor and the like (none of them is shown) to detect the operating conditions of the vehicle. The drive system further includes an engine ECU 23 that controls the operation of the engine 11 and an MG-ECU 24 that controls the inverter 19, for the control of the MG 12. The ECU 22 receives control signals and data signals from the ECUs 23 and 24 or transmits these signals to the ECUs 23 and 24 so that the ECUs 23 and 24 can control the engine 11, the MG 12 and the like according the operating conditions of the vehicle.

The MG-ECU 24 executes a routine for controlling the rotation speed of a motor (hereinafter this control is referred to as motor rotation speed control) shown in FIG. 4, which will be described later. In the motor rotation speed control, the MG-ECU 24 calculates a torque command value for the MG 12 when predetermined conditions for performing the motor rotation speed control have been met. The torque command value is ensured to match the actual rotation speed of the MG 12 to the target rotation speed thereof.

Figure 3:
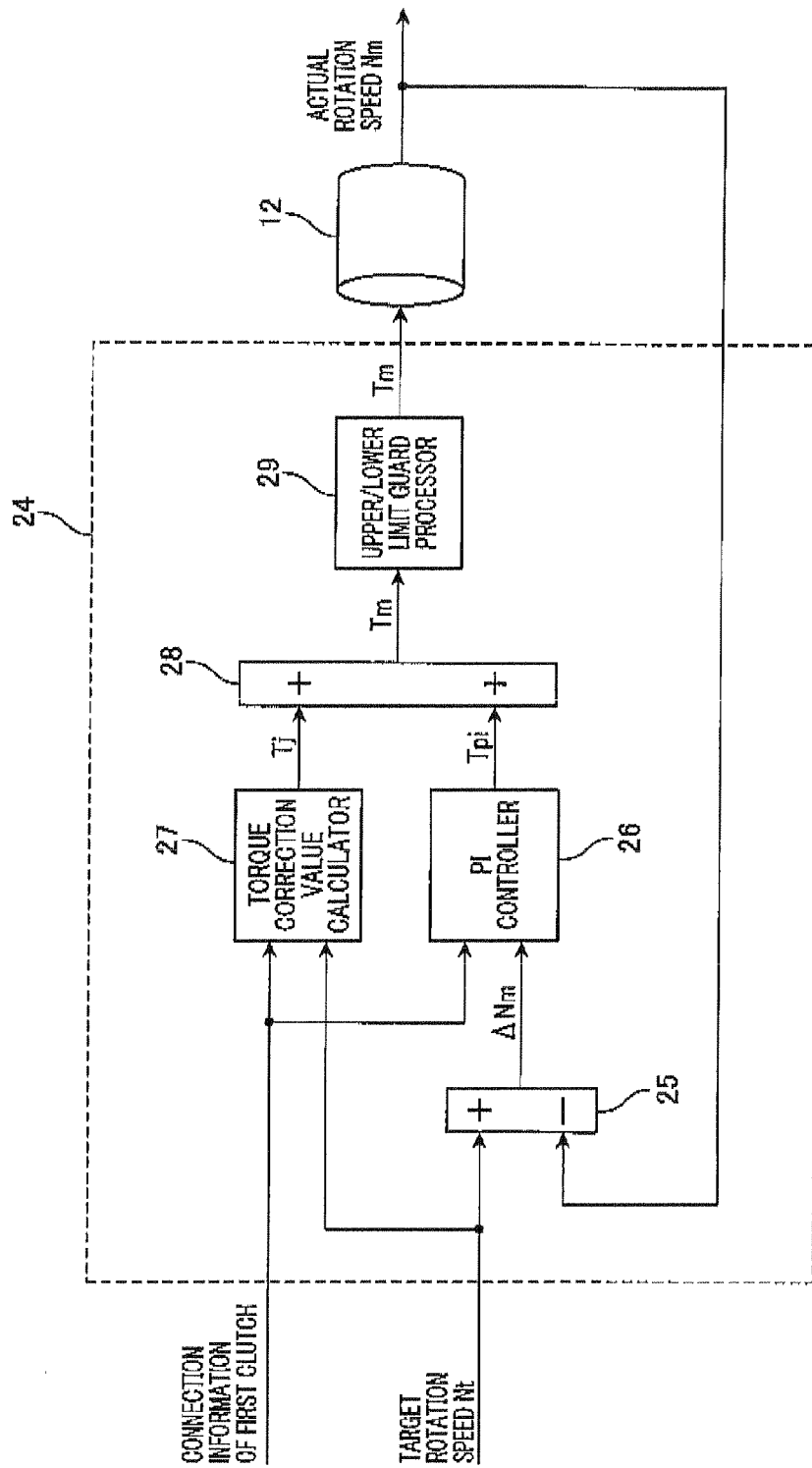
FIG. 3 is a block diagram illustrating functions exerted under motor rotation speed control.

FIG. 3 is a block diagram illustrating functions exerted under the motor rotation speed control performed by the MG-ECU 24. As shown in FIG. 3, the MG-ECU 24 includes a deviation device 25, a PI controller 26 (basic torque command value calculating means), a torque correction value calculator 27 (torque correction value calculating means), a torque command value calculator 28 (torque command value calculating means) and an upper/lower limit guard processor 29. In the motor rotation speed control, the MG-ECU 24 acquires a target rotation speed Nt of the MG 12 that has been calculated according to the operating conditions of the vehicle (e.g., accelerator position, vehicle speed, etc.) and an actual rotation speed Nm of the MG 12 that has been detected by the rotation speed sensor 21. The acquired target rotation speed Nt and actual rotation speed Nm are inputted to the deviation device 25 to calculate a deviation $\Delta Nm$ between the target rotation speed Nt and the actual rotation speed Nm of the MG 12. The PI controller 26 carries out PI control to calculate a basic torque command value Tpi for the MG 12. The basic torque command value Tpi is calculated such that the deviation $\Delta Nm$ between the target rotation speed Nt and the actual rotation speed Nm of the MG 12 will be reduced.

The torque correction value calculator 27 calculates a torque correction value Tj for the MG 12. The torque correction value Tj is calculated on the basis of a variation (i.e., an amount of changes) $\Delta Nt$ of the target rotation speed Nt of the MG 12 per predetermined time interval, and an inertia value J of the power train that integrally rotates with the rotary shaft of the MG 12.

The inertia value of the power train that integrally rotates with the rotary shaft of the MG 12 will differ depending on whether the first clutch 17 is in a connected state or in a disconnected state. Therefore, in the present embodiment, the inertia value J used in calculating the torque correction value Tj is ensured to be changed depending on whether the first clutch 17 is in a connected state or in a disconnected state.

Specifically, when the first clutch 17 is in a connected state, the power train ranging from the engine 11 to an input side (MG 12 side) of the second clutch 18 integrally rotates with the rotary shaft of the MG 12. Accordingly, the inertia value J used for calculating the torque correction value Tj is set to an inertia value J1 suitable for the power train ranging from the engine 11 to the input side of the second clutch 18.

Inertia Value J=J1

On the other hand, when the first clutch 17 is in a disconnected state, the power train ranging from an output side (MG 12 side) of the first clutch 17 to the input side of the second clutch 18 integrally rotates with the rotary shaft of the MG 12. Accordingly, the inertia value J used for calculating the torque correction value Tj is set to an inertia value J2 suitable for the power train ranging from the output side of the first clutch 17 to the input side of the second clutch 18.

Inertia Value J=J2

After that, the torque command value calculator 28 adds the torque correction value Tj to the basic torque command value Tpi to correct the basic torque command value Tpi, thereby obtaining a final torque command value Tm.

Then, the upper/lower limit guard processor 29 performs an upper/lower limit guard processing to thereby guard the torque command value Tm with predetermined upper and lower limit guard values. Thus, the torque command value Tm is outputted after being subjected to the upper/lower limit guard processing. The MG-ECU 24 controls the inverter 19 to control a voltage to be applied to the MG 12, so that the torque command value Tm is realized. Thus, the MG-ECU 24 controls the actual rotation speed Nm of the MG 12 so as to be matched to the target rotation speed Nt.

Figure 4:
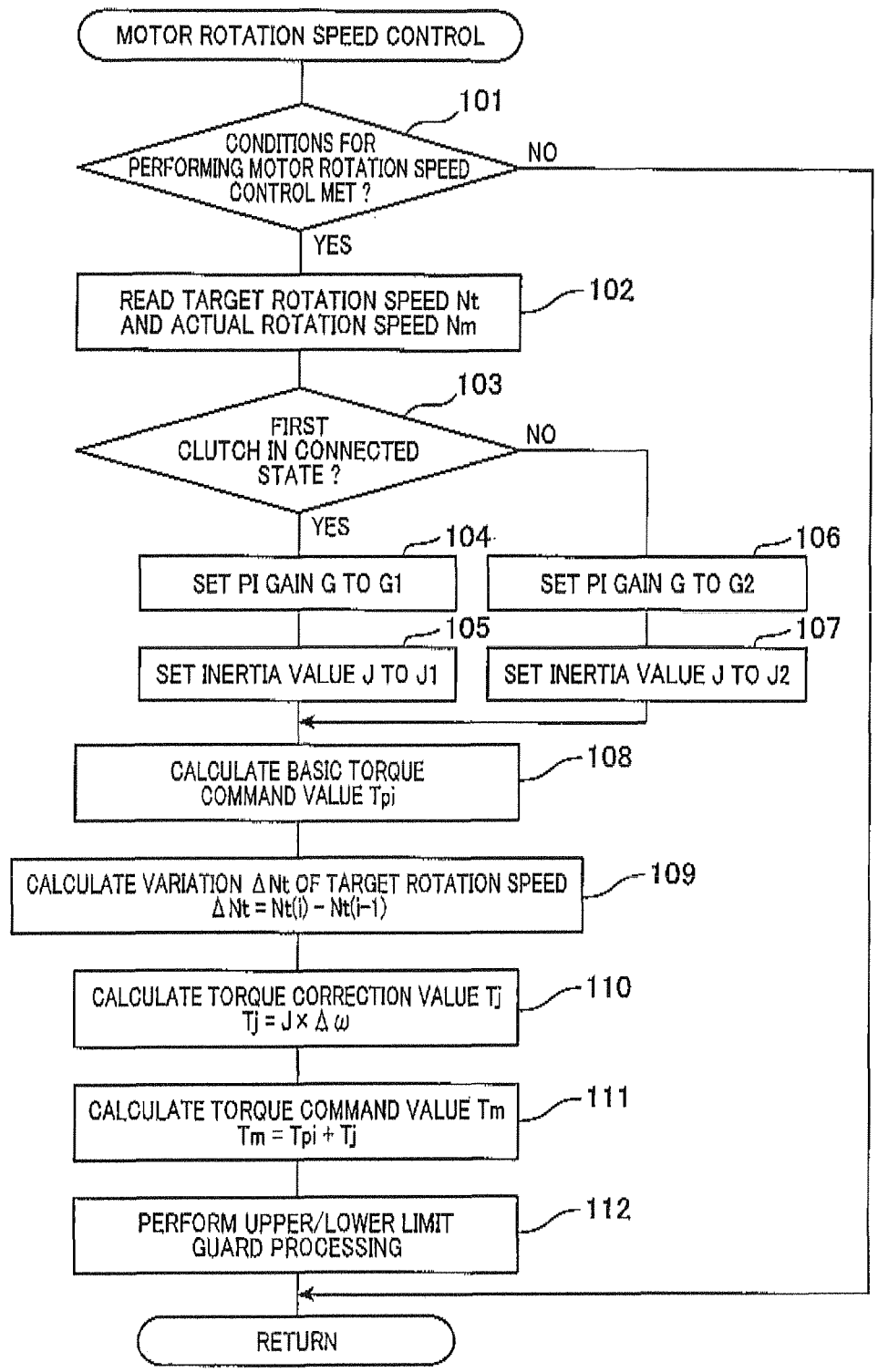
FIG. 4 is a flow diagram illustrating a flow of steps in a motor rotation speed control routine, according to the first embodiment.

The motor rotation speed control of the first embodiment described above is performed by the MG-ECU 24 in line with the motor rotation speed control routine shown in FIG. 4. This routine is specifically described below.

FIG. 4 is a flow diagram illustrating a flow of steps in the motor rotation speed control routine. The motor rotation speed control routine shown in FIG. 4 is repeatedly performed by the MG-ECU 24 at a predetermined calculation cycle Ts during a power-on period of the MG-ECU 24. When the present routine is started, the MG-ECU 24 firstly determines, at step 101, whether or not the conditions for performing the motor rotation speed control have been met. For example, this determination is made on the basis of whether the second clutch 18 is in a disconnected state (open state or slipping state) or not.

If it is determined, at step 101, that the conditions for performing the motor rotation speed control have not been met, the present routine is halted until the next iteration, without performing the processings on or after step 102 related to the motor rotation speed control.

On the other hand, if it is determined, at step 101, that the conditions for performing the motor rotation speed control have been met, the processings on or after step 102 related to the motor rotation speed control are carried out as follows. First, at step 102, the MG-ECU 24 reads the target rotation speed Nt of the MG 12 calculated according to the operating conditions of the vehicle (e.g., accelerator position, vehicle speed, etc.) and the actual rotation speed Nm of the MG 12 detected by the rotation speed sensor 21.

Then, control proceeds to step 103. At step 103, the MG-ECU 24 determines whether the first clutch 17 is in a connected state or not. If the first clutch 17 is determined to be in a connected state, control proceeds to step 104. At step 104, the MG-ECU 24 sets a PI gain G for calculating the basic torque command value Tpi (gain for the PI control) to a PI gain G1 of the first clutch 17 in a connected state.

PI Gain=G1

The PI gain G1 of the first clutch 17 in a connected state is set to a small value which is small to an extent of suppressing the variation (amount of changes) of the basic torque command value Tpi, the variation being attributed to the rotation fluctuation of the engine 11.

When the first clutch 17 is in a connected state, the power train ranging from the engine 11 to the input side of the second clutch 18 integrally rotates with the rotary shaft of the MG 12. Accordingly, at the subsequent step 105, the inertia value J used for calculating the torque correction value Tj is set to the inertia value J1 suitable for the power train ranging from the engine 11 to the input side of the second clutch 18.

Inertia Value J=J1

On the other hand, if it is determined, at step 103, that the first clutch 17 is not in a connected state (i.e. the first clutch 17 is in a disconnected state), control proceeds to step 106. At step 106, the MG-ECU 24 sets the PI gain G for calculating the basic torque command value Tpi to a PI gain G2 of the first clutch 17 in a disconnected state.

PI Gain G=G2

When the first clutch is in a disconnected state, the power train ranging from the output side of the first clutch 17 to the input side of the second clutch 18 integrally rotates with the rotary shaft of the MG 12. Accordingly, at the subsequent step 107, the MG-ECU 24 sets the inertia value J used for calculating the torque correction value Tj, to an inertia value J2 suitable for the power train ranging from the output side of the first clutch 17 to the input side of the second clutch 18.

Inertia Value J=J2

After setting the PI gain G and the inertia value J at steps 104 to 107, control proceeds to step 108. At step 108, the MG-ECU 24 calculates a deviation ΔN between the target rotation speed Nt and the actual rotation speed Nm of the MG 12. Then, under PI control, the MG-ECU 24 calculates the basic torque command value Tpi of the MG 12, using the PI gain G set at step 104 or 106, so that the deviation ΔN between the target rotation speed Nt and the actual rotation speed Nm is reduced.

After that, control proceeds to step 109 where the MG-ECU 24 calculates a difference between a this-time value t(i) and a previous-time value t(i−1) of the target rotation speed Nt, as the variation ΔNt of the target rotation speed of the MG 12 per predetermined time interval.

$$\Delta Nt = Nt(i) - Nt(i-1)$$

In this case, the variation ΔNt of the target rotation speed Nt resultantly corresponds to a variation of the present routine per calculation cycle Ts.

After that, control proceeds to step 110 where the MG-ECU 24 calculates an angular acceleration Δω of the MG 12 on the basis of the variation ΔNt of the target rotation speed Nt of the MG 12 and the calculation cycle Ts. Then, the MG-ECU 24 calculates the torque correction value Tj of the MG 12 through the following formula, using the angular acceleration Δω and the inertia value J set at step 105 or 107.

$$Tj = J \times \Delta\omega$$

After that, control proceeds to step 111 where the MG-ECU 24 adds the torque correction value Tj to the basic torque command value Tpi to correct the basic torque command value Tpi, thereby obtaining the final torque command value Tm.

$$Tm = Tpi + Tj$$

After that, control proceeds to step 112 where the MG-ECU 24 carries out the upper/lower limit guard processing to guard the torque command value Tm with predetermined upper and lower limit guard values. Specifically, when the torque command value Tm is larger than the upper limit guard value, the torque command value Tm is limited to the upper limit guard value (torque command value Tm=upper limit guard value). On the other hand, when the torque command value Tm is smaller than the lower limit guard value, the torque command value Tm is limited to the lower limit guard value (torque command value Tm=lower limit guard value).

In the first embodiment described above, in performing the motor rotation speed control, the PI gain G used for calculating the basic torque command value Tpi is reduced to some extent under PI control, so that the deviation ΔNm between the target rotation speed Nt and the actual rotation speed Nm of the MG 12 is reduced. Thus, the variation of the basic torque command value Tpi due to the rotation fluctuation of the engine 11 is suppressed to suppress the variation in the final torque command value Tm, thereby stabilizing the torque of the MG 12.

Further, the torque correction value Tj is calculated on the basis of the variation ΔNt of the target rotation speed Nt per predetermined time interval and the inertia value J. Then, using the torque correction value Tj, the basic torque command value Tpi is corrected to obtain the final torque command value Tm. Thus, the final torque command value Tm can be set by feed-forward correcting the basic torque command value Tpi. In this way, responsiveness of the motor rotation speed control is suppressed from being impaired, thereby reducing the rotation speed deviation of the MG 12 (deviation of the actual rotation speed Nm with respect to the target rotation speed Nt).

Figure 5:
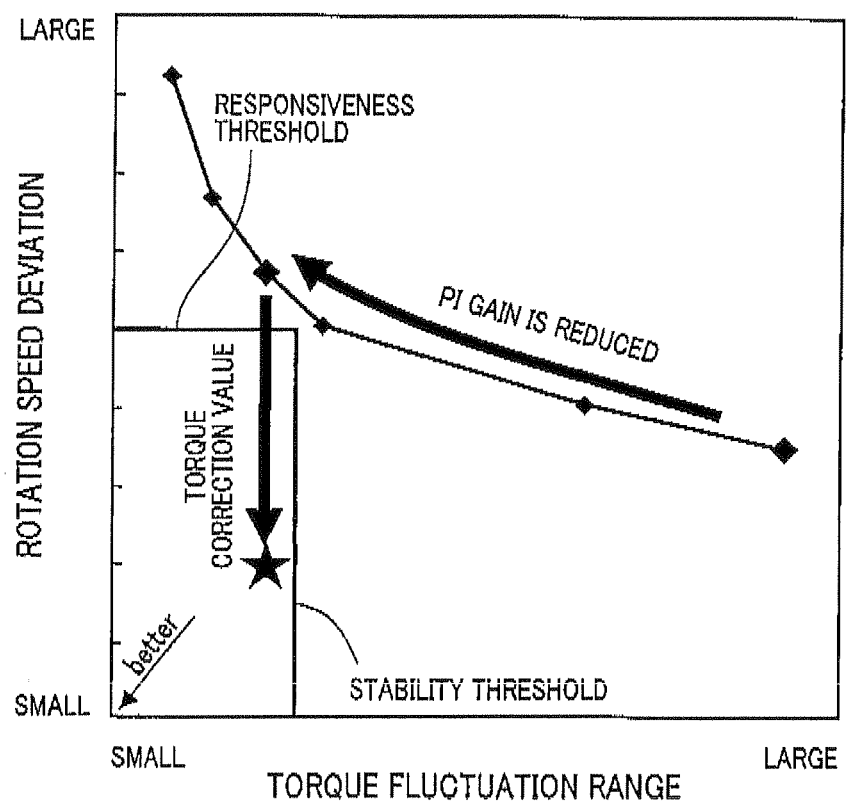
FIG. 5 is an explanatory diagram illustrating effects of the motor rotation speed control, according to the first embodiment.

FIG. 5 is an explanatory diagram illustrating effects of the motor rotation speed control, according to the first embodiment. As shown in FIG. 5, torque fluctuation range of the MG 12 (fluctuation range of the torque command value Tm) is made smaller than a predetermined stability threshold by reducing the PI gain. While stabilizing torque in this way, the responsiveness of the motor rotation speed control is ensured by performing torque correction value on the basis of the variation ΔNt of the target rotation speed Nt. As a result, the rotation speed deviation of the MG 12 can be made smaller than a predetermined responsiveness threshold. In this way, responsiveness and stability in the motor rotation speed control can be balanced.

The inertia value of the power train that integrally rotates with the rotary shaft of the MG 12 will differ depending on whether the first clutch 17 is in a connected state or in a disconnected state. Taking account of this, in the first embodiment, the inertia value used in calculating the torque correction value Tj is ensured to be changed depending on whether the first clutch 17 is in a connected state or in a disconnected state. Thus, using a suitable inertia value depending on whether the first clutch 17 is in a connected state or in a disconnected state, the torque correction value Tj can be accurately calculated.

[Second Embodiment]

Referring now to FIG. 6, hereinafter is described a second embodiment of the present invention. In the second embodiment, the components identical with or similar to those in the first embodiment are given the same reference numerals for the sake of omitting unnecessary explanation. The following description is given focusing on the differences from the first embodiment.

When the first clutch 17 is in a disconnected state, the rotation fluctuation of the MG 12 due to the rotation fluctuation of the engine 11 does not occur. Therefore, torque of the MG 12 can be stabilized by only tuning PI control, while responsiveness of the motor rotation speed control is ensured (i.e. no torque correction value is required).

In light of this, in the second embodiment, the MG-ECU 24 performs a motor rotation speed control routine shown in FIG. 6, which will be specifically described later. In this routine, the torque correction value Tj is calculated when the first clutch 17 is in a connected state, and the torque correction value Tj is set to zero when the first clutch 17 is in a disconnected state.

FIG. 6 is a flow diagram illustrating a flow of steps in the motor rotation speed control routine, according to the second embodiment. In the motor rotation speed control routine shown in FIG. 6, the MG-ECU 24 firstly determines, at step 201, whether or not the conditions for performing the motor rotation speed control have been met. If it is determined that the conditions for performing the motor rotation speed control have been met, control proceeds to step 202. At step 202, the MG-ECU 24 reads the target rotation speed Nt and the actual rotation speed Nm of the MG 12. Then, control proceeds to step 203 where the MG-ECU 24 determines whether the first clutch 17 is in a connected state or not.

If it is determined, at step 203, that the first clutch 17 is in a connected state, control proceeds to step 204. At step 204, the MG-ECU 24 sets the PI gain G for calculating the basic torque command value Tpi, to the PI gain G1 of the first clutch 17 in a connected state. Then, control proceeds to step 205 where the MG-ECU 24 sets the inertia value J used for calculating the torque correction value Tj to the inertia value J1 suitable for the power train ranging from the engine 11 to the input side of the second clutch 18.

After that, control proceeds to step 206 where the MG-ECU 24 calculates the difference between the this-time value Nt(i) and the previous-time value Nt(i−1) of the target rotation speed Nt, as the variation ΔNt of the target rotation speed of the MG 12 per predetermined time interval. Then, control proceeds to step 207 where the MG-ECU 24 calculates the angular acceleration Δω of the MG 12 on the basis of the variation ΔNt of the target rotation speed Nt and the calculation cycle Ts. After that, the MG-ECU 24 calculates the torque correction value Tj of the MG 12 through the following formula, using the angular acceleration Δω and the inertia value J (=J1) set at step 205.

$$Tj = J \times \Delta\omega$$

On the other hand, if it is determined, at step 203, that the first clutch 17 is not in a connected state (i.e., the first clutch is in a disconnected state), control proceeds to step 206. At step 206, the MG-ECU 24 sets the PI gain G for calculating the basic torque command value Tpi, to the PI gain G2 of the first clutch 17 in a disconnected state. Then, control proceeds to step 209 where the MG-ECU 24 sets the torque correction value Tj of the MG 12 to zero.

$$Tj = 0$$

After setting the torque correction value Tj at step 207 or 209, control proceeds to step 210. At step 210, the MG-ECU 24 calculates the deviation ΔN between the target rotation speed Nt and the actual rotation speed Nm of the MG 12. Then, the MG-ECU 24 calculates, under PI control, the basic torque command value Tpi of the MG 12, using the PI gain G that has been set at step 204 or 208, so that the deviation ΔN between the target rotation speed Nt and the actual rotation speed Nm will be reduced.

After that, control proceeds to step 211 where the MG-ECU 24 adds the torque correction value Tj to the basic torque command value Tpi to obtain the final torque command value Tm. Then, control proceeds to step 212 where the MG-ECU 24 carries out the upper/lower limit guard processing so that the torque command value Tm will be limited to predetermined upper and lower limit guard values.

In the second embodiment described above, the torque correction value Tj is calculated when the first clutch 17 is in a connected state and the torque correction value Tj is set to zero when the first clutch 17 is in a disconnected state. Thus, torque correction value is ensured not to be performed when the first clutch 17 is in a disconnected state in which rotation fluctuation is not caused in the MG 12 by the rotation fluctuation of the engine 11. In this way, the calculation process is simplified in a state where the first clutch 17 is disconnected to thereby reduce the calculation load.

Application of the present invention is not limited to the hybrid vehicle having the configuration shown in FIG. 2. For example, the present invention may be applied to a hybrid vehicle having a configuration in which either one of or both of the first clutch 17 (the clutch located between the engine 11 and the MG 12) and the second clutch 18 (the clutch located between the MG 12 and the transmission 18) is/are omitted. In other words, the present invention may be widely applied to hybrid vehicles having a configuration in which the motor is connected, in a motive-power-transmittable manner, to the power train for transmitting the motive power of the engine (i.e. a configuration in which the rotation fluctuation of the engine influences the rotation fluctuation of the motor).

The present invention may be embodied in several other forms without departing from the spirit thereof. The embodiments described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling a motor provided in a hybrid vehicle equipped with, in addition to the motor having a rotation shaft, an engine, a power train, and wheels, motive power from the engine being transmitted to the wheels via the power train, the motor being connected to the power train such that motive power from the motor is transmitted to the power train, the apparatus comprising:
    an electronic control unit, comprising a computer processor, the electronic control unit being at least configured to:
        calculate a basic torque command value of the motor by using a gain for proportional plus integral control so as to reduce a deviation between a target rotation speed of the motor and an actual rotation speed of the motor;
        calculate a torque correction value for the motor based on a variation of the target rotation speed which is obtained per unit time and a value of inertia of the power train rotated integrally with the rotation shaft of the motor; and
        calculate a torque command value finally supplied to the motor, by correcting the basic torque command value with use of the torque correction value; and
    a clutch which selectively connects and disconnects the power train between the engine and the motor, wherein
    the electronic control unit is configured to reduce the gain for proportional plus integral control and calculate the torque correction value based on the value of inertia which is changed between a connected state of the clutch and a disconnected state of the clutch.

2. The apparatus of claim 1, wherein:
the torque correction value is calculated when the clutch is in the connected state and to set the torque correction value to zero when the clutch is in the disconnected state.

3. A power train system for a hybrid vehicle: comprising:
a power train;
an electric motor having a rotation shaft and arrange in the power train,
an engine arranged in the power train,
wheels connected to the power train, motive power from the engine being transmitted to the wheels via the power train, the motor being connected to the power train such that motive power from the motor is transmitted to the power train; and
an ECU (electronic control unit) configured to:
calculate a basic torque command value of the motor by using a gain for proportional plus integral control so as to reduce a deviation between a target rotation speed of the motor and an actual rotation speed of the motor;
calculate a torque correction value for the motor based on a variation of the target rotation speed which is obtained per unit time and a value of inertia of the power train rotated integrally with the rotation shaft of the motor; and
calculate a torque command value finally supplied to the motor, by correcting the basic torque command value with use of the torque correction value; and
a clutch which selectively connects and disconnects the power train between the engine and the motor, wherein
the ECU is configured to reduce the gain for proportional plus integral control and calculate the torque correction value based on the value of inertia which is changed between a connected state of the clutch and a disconnected state of the clutch.

4. The power train system of claim 3, comprising a clutch which selectively connects and disconnects the power train between the engine and the motor,
    the ECU is configured to calculate the torque correction value when the clutch is in the connected state and to set the torque correction value to zero when the clutch is in the disconnected state.

5. The apparatus of claim 1, wherein the electronic control unit is further configured to:
    calculate an angular acceleration of the motor on the basis of the variation of the target rotation speed; and
    calculate the torque correction value based on the angular acceleration and the value of inertia of the power train.

6. The apparatus of claim 5, wherein the torque correction value is calculated by multiplying the angular acceleration and the value of inertia of the power train.

7. The power train system of claim 3, wherein the ECU is further configured to:
    calculate an angular acceleration of the motor on the basis of the variation of the target rotation speed; and
    calculate the torque correction value based on the angular acceleration and the value of inertia of the power train.

8. The power train system of claim 7, wherein the torque correction value is calculated by multiplying the angular acceleration and the value of inertia of the power train.

* * * * *